UNITED STATES PATENT OFFICE.

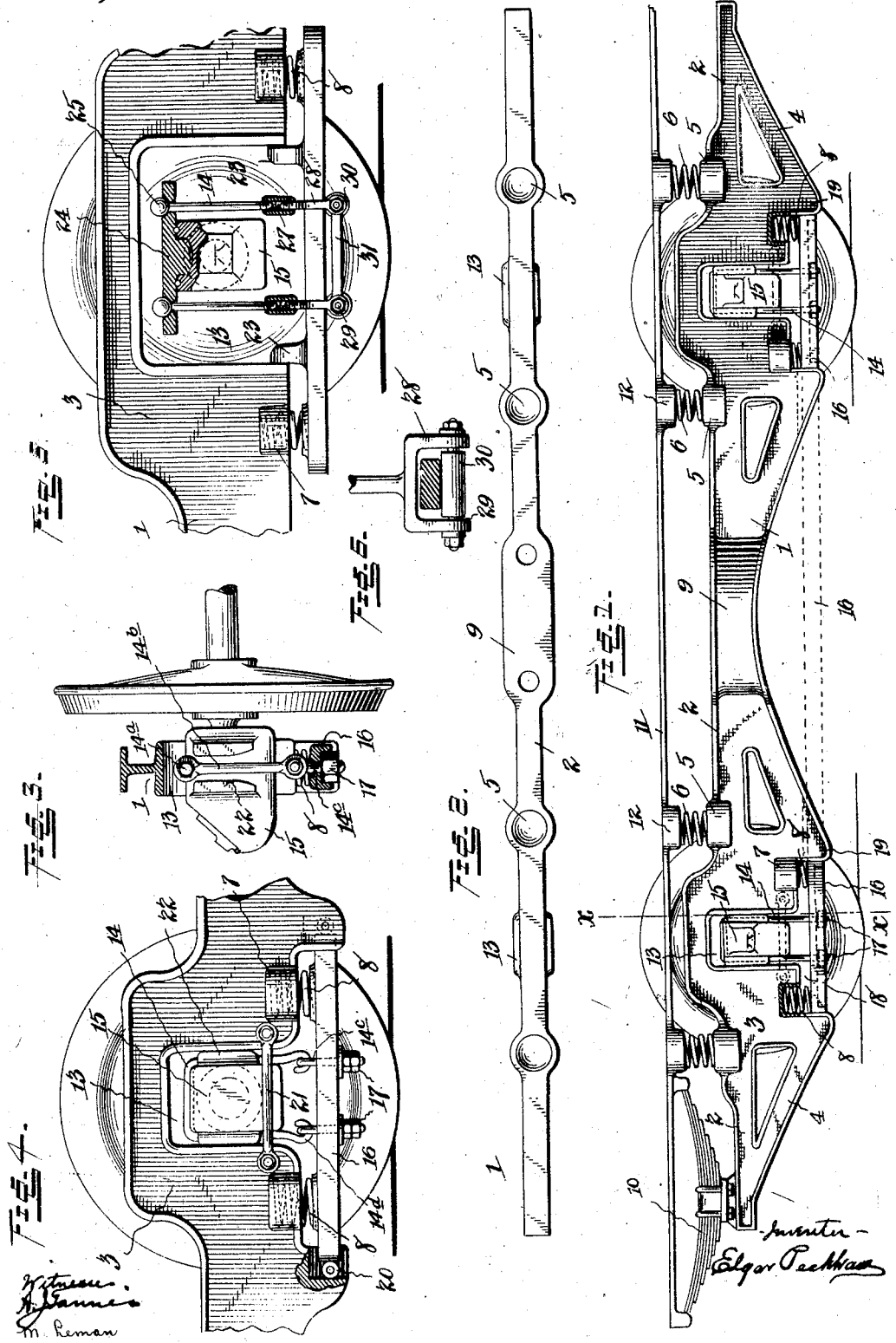

EDGAR PECKHAM, OF WESTMINSTER, LONDON, ENGLAND, ASSIGNOR TO MARY J. PECKHAM, OF LONDON, ENGLAND.

TRUCK FOR RAILWAY AND TRAMWAY VEHICLES.

No. 905,354.

Specification of Letters Patent.

Patented Dec. 1, 1908.

Application filed May 22, 1906. Serial No. 318,124.

*To all whom it may concern:*

Be it known that I, EDGAR PECKHAM, a citizen of the United States, residing at Queen Annes Chambers, Westminster, London, S. W., England, have invented certain new and useful Improvements in and Relating to Trucks for Railway and Tramway Vehicles, of which the following is a specification.

The present invention relates to improvements in means for supporting the trucks or under-carriages of railway and tramway vehicles from the axle journal-boxes and the improvement also embodies a novel form of truck frame which also constitutes a part of my invention.

One of the objects of my invention is to provide a form of suspension for the truck or body of a vehicle which while being particularly adaptable to electrically propelled vehicles is equally serviceable for other self-propelled vehicles. This gear or truck suspension device is designed to allow the journal-box and axle to move easily either laterally, radially, or both as desired, so as to adjust itself to the condition of the railway track and relieve the wheel flanges and rails from the pressure produced by the weight of the car body when turning curves.

Another object of my invention is to provide by means of a spring plate or plank, an increased supporting base for the truck frame without increasing the distance between the wheel centers.

When the connection between the axles of a vehicle and the truck is rigid with the exception of the usual spring-controlled movement up and down, the effect of side thrust on the wheels and axles produced when the vehicle is running around a curve or on an uneven track is disastrous to the wheel flanges and rail and also additional power is required to propel the vehicle, for under these conditions the friction between the wheels and the rails is increased. The momentum given to a vehicle must when deviated from a straight course be overcome when the vehicle for instance is running around a curve, and if the connection between the truck and the running gear is rigid so far as lateral movement is concerned, the sudden deviation causes a severe side thrust on the wheels on one side of the vehicle and consequently often the flanges are broken and derailment of the vehicle is caused thereby; but if the connection aforesaid is yieldable, a lateral movement is imparted at the point of suspension to give way to the side thrust and in consequence the bad effect of side thrust is entirely obviated.

It is desirable in cases where the permanent way on a railway or tramway line is such that sharp curves are to be met with, to provide a suspension device between the truck or vehicle and the wheels and axles thereof which will permit the wheels and axles to adjust themselves according to the curvature and condition of the track. A suspension device of this description is termed a "radial gear" and in developing my improved suspension device I have provided a construction for such a gear.

Another object of my invention is to provide a truck side frame member of a new form.

My improved construction embodies in one member as integral parts, the several members which have in the past been constructed separately and afterwards joined together to build up and form a complete cantilever side frame as described for instance in my application for U. S. Patent Serial No. 282,920½ filed October 16th 1905. The parts in question consist of a top member, pedestals for the axle journal-boxes, end truss members and pockets for both the axle springs and the car springs. An important feature in this construction is that the side frame can be cast and still possess an efficient amount of strength and also being cast in one piece the cost of manufacture is considerably lessened.

In the accompanying drawings which illustrate my invention, Figure 1 is a side elevation of a completed truck mounted on the wheels and showing my improved construction of the side frame and the truck suspension; Fig. 2 is a top plan view of the said side member; Fig. 3 is a section on line *x x* of Fig. 1 and illustrates the truck suspension device; Fig. 4 is a side elevation of part of a truck and shows the suspension device with details of construction slightly different from those shown in the preceding figures; Fig. 5 shows in side elevation a part of a truck having a radial suspension device; Fig. 6 is a detail view of the end of a hanger to show one means for obtaining a rotary movement between the radiating part and the other part of the suspension device.

Referring to Fig. 1 of the drawings, 1 indicates the truck frame side member made in one piece, preferably a casting, and includes as integral parts thereof the equivalent of a top member designated by the numeral 2, pedestals 3, end truss members 4 and if desired, also the cup-shaped pockets 5 for the car springs 6 and the pockets or housings 7 for the axle springs 8. The frame 1 is preferably reinforced at its middle to give additional strength at that point and this reinforcement 9 serves to provide bearings for the motor suspension and for hanging brakes which act on the permanent way. Truss portions 4 are provided to support and brace the ends of the frame which carry the springs 10 for supporting the ends of the car. These springs are connected to the car-plate 11 which is in turn secured to the car body (not shown). The car plate 11 has formed on its under-side pockets 12 to receive the upper ends of the car supporting springs 6.

My improved truck frame and also the suspension device hereinafter described, is applicable to various types of trucks which include maximum traction and double trucks, but the construction is favorable and especially suitable for single trucks with a long spring base. The distance the pedestal sections 3 are apart determines the length of the wheel base, the recesses 13 adapted to receive the axle journal-boxes being located centrally in the pedestal sections 3.

A truck frame constructed in accordance with my invention can have an extra long spring base so consequently a car body of extra length can be safely carried. This is permissible on account of the truss members 4 at the ends of the truck member acting as braces or supports for the ends of the car body; also my proposed construction of this complete member 1 is such that greater rigidity can be obtained, so the effect of end thrust to the truck and pitching and swaying of the vehicle body is taken up entirely by the supporting springs.

Another important feature in my truck frame construction and also the truck suspension which will presently be described, is that very few bolts and nuts are employed. This is another advantage over other trucks, for considerable trouble is experienced when the nuts work loose.

Referring first to Figs. 1, 3 and 4, my improvements relating to the suspension of the truck from the axle journal boxes consists of a U-shaped link 14 hanging down from the top of the journal box 15 and carrying at its ends a plank or plate 16 which is held by the nuts 17 on the threaded ends of the link 14. The journal box 15 is located in the recess 13 of the pedestal portion of the frame member which is permitted to move up and down under control of the axle springs 8 interposed between the spring plank or plate 16 and the under-side of the truck side member 1. This member is preferably recessed at 18 to allow the spring plank to rest therein so that it will be above the lower extremities of the truck frame and also allow a space for the vertical movements of the truck.

In Fig. 1 the link 14 is a continuous U-shaped member placed in an inverted position over the journal box. When a link of this description is employed, to obtain lateral movement of the axle, the journal boxes must slide under the supporting links, but if the preferred construction is employed, as shown for instance in Fig. 3, the links are made in several parts which are flexibly joined together. With this latter construction, the axle and journal boxes are permitted to move laterally independent of the truck. When such lateral movement occurs the links will be inclined, this being permitted by the flexible connection of the links to the suspended member 16. This latter member is restrained from any movement independent of the truck frame except the vertical movement allowed between it and the truck frame member 1. A link suspension device or hanger made in several parts consists of the top bar 14$^a$ which lies in a groove on the top side of the journal box. The side pieces 14$^b$ are hung from the top bar and at their lower ends are pivoted to a short piece 14$^c$ which is threaded to receive the retaining nuts 1$^7$ It is necessary that the links or hangers should be of great strength for they are required to carry the full load of the car body and truck. For this and other reasons I may find it advantageous to construct the hanger as shown in Fig. 4. In this construction the hanger consists of a solid forged U-shaped link 14 provided with hooked ends 14$^d$ which engage and hook into eyes formed at the ends of the pieces 14$^e$ which connect the plate 16. This plate is preferably hollowed out as shown in full lines in Fig. 3 and in dotted lines in Fig. 1. The nuts 17 will fit in the hollowed recess and be prevented from turning. This acts as a very effective nut-lock which is of considerable importance, for it is essential that these nuts should not work loose.

The manner of mounting or dismounting the truck consists in first jacking up the truck to relieve the suspending device from the weight of the car; the nuts 17 are then adjusted according to the height the truck is to hang and when this adjustment is effected the load is allowed to come on the suspending device; the nuts 17 are then pulled up into the hollowed portion of the plank 16 and effectively locked.

The spring plank or plate 16 lies in the recess 18 of the truck member 1 with its ends abutting against the projections 19 of the member 1; the truck can then move up and down under control of the springs 8, or if the wheels strike an obstacle on the track the force of the blow is taken up by the yielding suspension. I may however as shown in dotted lines in Fig. 1 have a single spring plank 16 extending from one pedestal section to the other. The spring plank in either form, besides serving as a spring suspension, also acts as a means for preventing end thrust to the truck causing the journal boxes to become clamped in their recesses. This prevention happens because the ends of the spring plank abut against the projections 19 of the truck frame and thereby the recesses 13 are prevented from closing up. In order that undue friction does not occur, antifriction rollers 20 are interposed between the contact surfaces of the ends of the plank and the frame projections. Also as an additional preventative of clamping of the journal boxes, I may place a brace 21 across the gap made by the recess. The journal boxes are provided on each side with a pair of projecting lugs 22 adapted to furnish wearing surfaces for the journal box against the side walls of the recess. These lugs also form a housing for the link 14 and prevent it from rubbing against the walls of the recess when it is tilting under the effect of side thrust to the axle journal boxes.

In Fig. 5 a form of construction for a radial gear is shown. In this construction the truck frame can be constructed as shown in Fig. 1 with the exception that a wider recess is made for the journal boxes. The suspension device as shown in Fig. 5 is also similar with the exception that the ends of the spring plank 16 do not abut against the member 1 but instead thereof, owing to the greater space allowed in the recess, I may provide lugs 23 on the plank 16. These lugs abut against the side walls of the recess 13 and thereby prevent end movement of the said plank.

With the object in view of permitting the axle and wheels to radiate with respect to the curves of the track on which the vehicle is running, I employ a spring suspension which will allow both a lateral and a radial movement. The radial movement is obtained by the plate 24 pivoted, preferably with ball-bearings, on the top of the journal box. The plate 24 has projections 26 extending out beyond the sides of the journal box, and in these projections are sockets for balls 25 on the upper ends of the connecting bars 14. The lower ends of these bars are threaded to receive turn-buckles 27 or other adjustable connecting devices. A piece 28 with a forked end is connected to each of the connecting bars 14 by the turn-buckles. The spring plank 16 lies between the forked ends of the piece 28 and if desired the central portion of the plank may be curved slightly to allow radiation of the axle or the forked ends of the piece 28 are spread to leave sufficient space between the side of the plank and the forked ends. The spindle 29 furnishes a bearing for the roller 30 upon which the spring plank rests.

It will be understood that when the axle of the vehicle must radiate to conform with a curve in the track, the radiation will take place with the pivot 24 on one journal box as a center. The journal box on the opposite end of the axle must necessarily travel in a circular course, and to allow it to travel its full course without the journal box, or as illustrated the projections of the pivotal plate 24, being obstructed, the recess 13 will be wide enough to permit all the movement required. The friction rollers 30 have to carry the full load of the vehicle so it is necessary that they should have a strong bearing, and if desired the connecting strip 31 may provide bearings for more rollers.

It will be seen that with my non-radial gear hereinbefore described, a movement up and down and laterally is permitted between the truck and the journal box, but with the radial gear these vertical and lateral movements are obtained plus the radial movement; this latter suspension is then practically a universal spring connection between the truck and the axle journals. The connection between the hanger and the journal box as shown in Fig. 5 may also be adopted in a non-radial gear construction. The projections which support the ball-shaped end of the bars would be preferably formed in the top of the journal boxes. Also the hanger or links shown in the other figures of the drawing, or any other suitable form, may be employed with the radial suspension. If a hanger shown with either of the other modifications were used the plate 24 would be provided with a groove and the link would hang over the projections so it would clear the journal box to allow the latter to turn.

Another important feature of my improved spring plank suspension device is that the effective wheel base for the truck is increased without increasing the distance between the wheel centers. The effective wheel base when a spring plank constructed and arranged in accordance with my invention is employed extends from the axle spring nearest to one end of the truck to the corresponding spring at the other end of the truck.

What I claim as new and desire to secure by Letters Patent of the United States is:—

1. A car-truck suspension device consisting of means for providing a yielding suspension of the truck from the axle or axles of the car or vehicle to permit an independent separate or combined lateral and radial movement of the axle or axles, the means for suspending the truck also serving to increase the effective wheel base of the truck, the said means consisting of an independent suspended member, plate or bar supported from the axle journal boxes by a depending link, links, or hanger, said plate or member bearing against the under-side of the truck frame side member and held against longitudinal and lateral movement by said frame.

2. In combination, as a suspension device for a car truck, an independent suspended member or plate supported from the axle journal box by a depending link, links or hanger, said plate or member bearing against the under-side of the truck frame member through the medium of springs, and recesses or the equivalent on the truck frame side member or projections on the plate or independent member which restrain the latter member from moving out of its set position, substantially as shown and described.

3. In combination, as a suspension device for a car truck which permits independent radial movement of the car axle, an independent suspended member or plate supported from the axle journal box by a depending link, links or hanger, said plate or member bearing against the under-side of the truck frame member through the medium of springs, an anti-friction roller or similar device carried at the extremities of truck supporting links or the like and an arrangement of devices whereby the said independent suspended member is loosely supported upon or connected to the said roller or anti-friction device, substantially as described.

4. In combination, as a suspension device for a car truck, an independent suspended member or plate supported from the axle journal box by a depending link, links or hanger, said plate or member bearing against the under-side of the truck frame member through the medium of springs, and a pivoted or swiveling plate carried on the top-side of the axle journal box, the supporting links depending from the said pivoted plate and the connection between the links and the said supported independent member being such that an independent radial movement of the axle is allowed, substantially as described.

5. A suspension device for a car truck consisting of a link or hanger depending from the journal box and supporting at its lower ends a spring plank or independent member, the connection between the link and the said plank or independent member being such that an independent lateral or radial or lateral and radial movement of the axle is allowed, substantially as described.

6. In a device for suspending the truck of a vehicle from the axle journal box a link or hanger carrying at its ends a plank or seating for the axle springs, nuts on the ends of the hanger for adjusting the length of the hanger, and a recess in the under-side of the plank to serve as a means for locking the adjusting nuts, substantially as described.

7. In combination with a car truck having a side frame member constructed to include as integral parts thereof the member constituting the top member or bar, the pedestal sections and end truss members of the truck frame side member, a device for suspending the truck from the axle journal box and increasing the effective wheel base of the truck, the said device consisting of a plate or plank supported at the ends of a hanger depending from the top of the journal box, said plank being in engagement with portions of the truck frame side member and held against lateral and longitudinal movement thereby, and a spring or springs interposed between the said plank and the lower side of the truck frame member, all substantially as described.

8. In a suspension for trucks, the combination with the axle of a journal box mounted thereon, a link depending from the journal box, a plate supported upon said link, means for preventing a lateral or longitudinal movement of said plate, and springs interposed between said plate and the lower portion of the truck frame.

9. In a suspension device for trucks, the combination with the truck frame of an axle, an axle box mounted thereon, an independent member suspended therefrom and held against longitudinal or lateral movement with respect to the truck frame, and springs interposed between said member and the lower portion of the truck frame.

10. In a spring suspension for trucks, in combination, with the truck frame of an axle, an axle box mounted thereon, an independent member suspended from the axle box, recesses or equivalent devices upon said member or upon the lower portion of the truck frame for preventing a relative lateral or longitudinal movement therebetween, and springs interposed between said member and said truck frame.

11. In a spring suspension for trucks, in combination, a truck frame provided with pedestals, an axle extending between said pedestals, an axle box resting upon said axle, an independent supporting device suspended from said axle box and fixed against lateral or longitudinal movement with respect to the truck frame but with respect to which said axle box is laterally and longitudinally movable, and springs interposed between said device and the truck frame.

12. In a spring suspension for trucks, in combination, a truck frame provided with pedestals, an axle extending between said pedestals, an axle box resting upon said axle, a link depending from said axle box, said axle box being radially and laterally movable with respect to said link, a plate supported upon said link, means for preventing relative lateral and longitudinal movement between said plate and the truck frame, and springs interposed between said plate and said truck frame.

In witness whereof I have hereunto set my hand this 10th day of May 1906.

EDGAR PECKHAM.

Witnesses:
ARNOLD J. TANNER,
H. D. JAMESON